(12) United States Patent
Kuchenbrod et al.

(10) Patent No.: US 9,646,188 B1
(45) Date of Patent: May 9, 2017

(54) IMAGING MODULE AND READER FOR, AND METHOD OF, EXPEDITIOUSLY SETTING IMAGING PARAMETERS OF AN IMAGER BASED ON THE IMAGING PARAMETERS PREVIOUSLY SET FOR A DEFAULT IMAGER

(71) Applicant: SYMBOL TECHNOLOGIES, LLC, Lincolnshire, IL (US)

(72) Inventors: Harry E. Kuchenbrod, Kings Park, NY (US); Chinh Tan, Setauket, NY (US); David P. Goren, Smithtown, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/171,266

(22) Filed: Jun. 2, 2016

(51) Int. Cl.
  *G06K 7/10* (2006.01)
  *G06K 7/14* (2006.01)

(52) U.S. Cl.
  CPC ..... *G06K 7/10722* (2013.01); *G06K 7/10752* (2013.01); *G06K 7/10801* (2013.01); *G06K 7/10811* (2013.01); *G06K 7/10881* (2013.01); *G06K 7/1413* (2013.01); *G06K 7/1417* (2013.01)

(58) Field of Classification Search
  CPC ............ G06K 7/1417; G06K 7/10801; G06K 7/10811; G06K 7/10752; G06K 7/10881; G06K 7/10722
  See application file for complete search history.

(56) References Cited

U.S. PATENT DOCUMENTS

| | | | | |
|---|---|---|---|---|
| 4,506,150 A | * | 3/1985 | Ogasawara | G02B 7/36 250/201.2 |
| 5,702,059 A | * | 12/1997 | Chu | G01J 3/51 235/454 |
| 5,808,296 A | * | 9/1998 | McMonagle | H03F 3/45475 250/221 |
| 6,621,987 B1 | * | 9/2003 | Tsai | G03B 7/08 348/229.1 |
| 7,148,923 B2 | * | 12/2006 | Harper | G06K 7/10722 235/462.01 |
| 7,227,117 B1 | * | 6/2007 | Lackemann | G06K 7/10584 235/462.26 |
| 7,546,951 B2 | * | 6/2009 | Kotlarsky | G06K 7/10683 235/462.01 |
| 7,780,089 B2 | * | 8/2010 | Wang | G06K 7/14 235/462.11 |
| 2002/0176605 A1 | * | 11/2002 | Stafsudd | G06K 9/3241 382/106 |
| 2005/0140786 A1 | * | 6/2005 | Kaplinsky | H04N 5/23203 348/207.1 |

(Continued)

*Primary Examiner* — Daniel Walsh

(57) ABSTRACT

An imaging reader has near and far imagers for imaging targets to be read over a range of working distances. A default imager captures a minor portion of an image of the target, and rapidly determines its light intensity level. The exposure and/or gain values of the default imager are set to predetermined values based on the determined light intensity level. If the target is not decoded by the default imager, then the exposure and/or gain values of another imager are set to predetermined values based on the exposure and/or gain values that were previously set for the default imager.

20 Claims, 6 Drawing Sheets

(56) References Cited

U.S. PATENT DOCUMENTS

| | | | | |
|---|---|---|---|---|
| 2006/0011725 A1* | 1/2006 | Schnee | G06K 7/10722 | 235/454 |
| 2006/0065732 A1* | 3/2006 | Barkan | G06K 7/10752 | 235/454 |
| 2007/0002163 A1* | 1/2007 | Madej | G06K 7/10 | 348/362 |
| 2007/0102520 A1* | 5/2007 | Carlson | G06K 7/10722 | 235/454 |
| 2007/0177048 A1* | 8/2007 | Van Dyke | G03B 7/00 | 348/362 |
| 2008/0296379 A1* | 12/2008 | Hepworth | G06K 7/10544 | 235/455 |
| 2009/0001163 A1* | 1/2009 | Barkan | G06K 7/10722 | 235/454 |
| 2010/0252635 A1* | 10/2010 | Drzymala | G06K 7/10722 | 235/462.41 |
| 2012/0000982 A1* | 1/2012 | Gao | G06K 7/146 | 235/455 |
| 2012/0091206 A1* | 4/2012 | Goren | G06K 7/14 | 235/470 |
| 2012/0181338 A1* | 7/2012 | Gao | G06K 7/12 | 235/455 |
| 2013/0083201 A1* | 4/2013 | Takacs | H04N 5/23229 | 348/169 |
| 2013/0248602 A1* | 9/2013 | He | G06K 7/10752 | 235/455 |
| 2014/0362286 A1* | 12/2014 | Komi | G06K 7/10732 | 348/374 |
| 2015/0244923 A1* | 8/2015 | Lee | H04N 9/045 | 348/234 |

\* cited by examiner

IMAGING MODULE AND READER FOR, AND METHOD OF, EXPEDITIOUSLY SETTING IMAGING PARAMETERS OF AN IMAGER BASED ON THE IMAGING PARAMETERS PREVIOUSLY SET FOR A DEFAULT IMAGER

BACKGROUND OF THE INVENTION

The present invention relates generally to an imaging module and an imaging reader for, and a method of, imaging targets to be electro-optically read by image capture over a range of working distances, and, more particularly, to expeditiously setting one or more imaging parameters, such as exposure and/or gain values, of an imager based on a previous setting of exposure and/or gain values determined for a default imager.

Solid-state imaging systems or imaging readers have been used, in both handheld and/or hands-free modes of operation, to electro-optically read targets, such as one- and two-dimensional bar code symbol targets, and/or non-symbol targets, such as documents. A handheld imaging reader includes a housing having a handle held by an operator, and an imaging module, also known as a scan engine, supported by the housing and aimed by the operator at a target during reading. The imaging module includes an imaging assembly having a solid-state imager or imaging sensor with an imaging array of photocells or light sensors, which correspond to image elements or pixels in an imaging field of view of the imager, and an imaging lens assembly for capturing return light scattered and/or reflected from the target being imaged, and for projecting the return light onto the array to initiate capture of an image of the target. Such an imager may include a one- or two-dimensional charge coupled device (CCD) or a complementary metal oxide semiconductor (CMOS) device and associated circuits for producing and processing electronic signals corresponding to a one- or two-dimensional array of pixel data over the imaging field of view.

In some applications, for example, in warehouses, it is sometimes necessary for the same reader to read not only far-out targets, e.g., on products located on high overhead shelves, which are located at a far-out range of working distances on the order of thirty to fifty feet away from the reader, but also close-in targets, e.g., on products located at floor level or close to the operator, which are located at a close-in range of working distances on the order of less than two feet away from the reader. The reader may capture the return light from the far-out targets by employing a far-out imager having a relatively narrow field of view, and may capture the return light from the close-in targets by employing a close-in imager having a relatively wide field of view.

However, the use of more than one imager presents a challenge to reader performance. For optimum reader performance, each target must be read by the correct imager, and the correct imager should be set with one or more optimum imaging parameters, such as exposure values and/or gain values. These values are typically different for each imager, and vary, among other things, as a function of the working distance and the brightness of the captured image. Increasing the exposure and/or the gain values of each imager will increase the captured image brightness of the image of the target, and vice versa.

In order to set one or more optimum imaging parameters, it is known for a default one of the imagers to capture an entire image from the target in a frame, to analyze the brightness of the entire image, to change the imaging parameters based on the analysis of the brightness of the entire image, to capture another entire image from the target in another frame, and to repeat all the steps of this process for as long, and for as many times, and for as many frames, as it takes until the brightness of the entire image is within an acceptable level to enable the target to be successfully read by the default imager. If the target is not successfully read by the default imager, then it is known for the reader to switch to the other imager, and to again repeat all the steps of this process for as long, and for as many times, and for as many frames, as it takes until the brightness of the entire image is within an acceptable level to enable the target to be successfully read by the other imager. An automatic exposure controller (AEC) is typically used to control each imager's exposure, and an automatic gain controller (AGC) is typically used to control each imager's gain. A typical known strategy is to use exposure priority, in which the exposure is increased first until a maximum exposure time or threshold (typically around 4-8 ms in order to reduce hand jitter motion effects for a handheld reader) is reached. If the image brightness is still too low, then the gain is increased. This strategy maximizes the signal-to-noise ratio (SNR) of each imager, because the gain is only increased when necessary.

Although generally satisfactory for its intended purpose, this known multi-step process is very slow and inefficient in practice, especially when more than one imager is involved, and when the entire known process has to be repeated for each additional imager. Reader performance can be deemed sluggish, and is unacceptable in many applications.

Accordingly, there is a need to expeditiously set a default imager with one or more optimum imaging parameters, and to expeditiously set one or more optimum imaging parameters for another imager based on the imaging parameters that were previously set for the default imager, in order to more rapidly, efficiently, reliably, and successfully read both far-out targets and close-in targets with the same reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
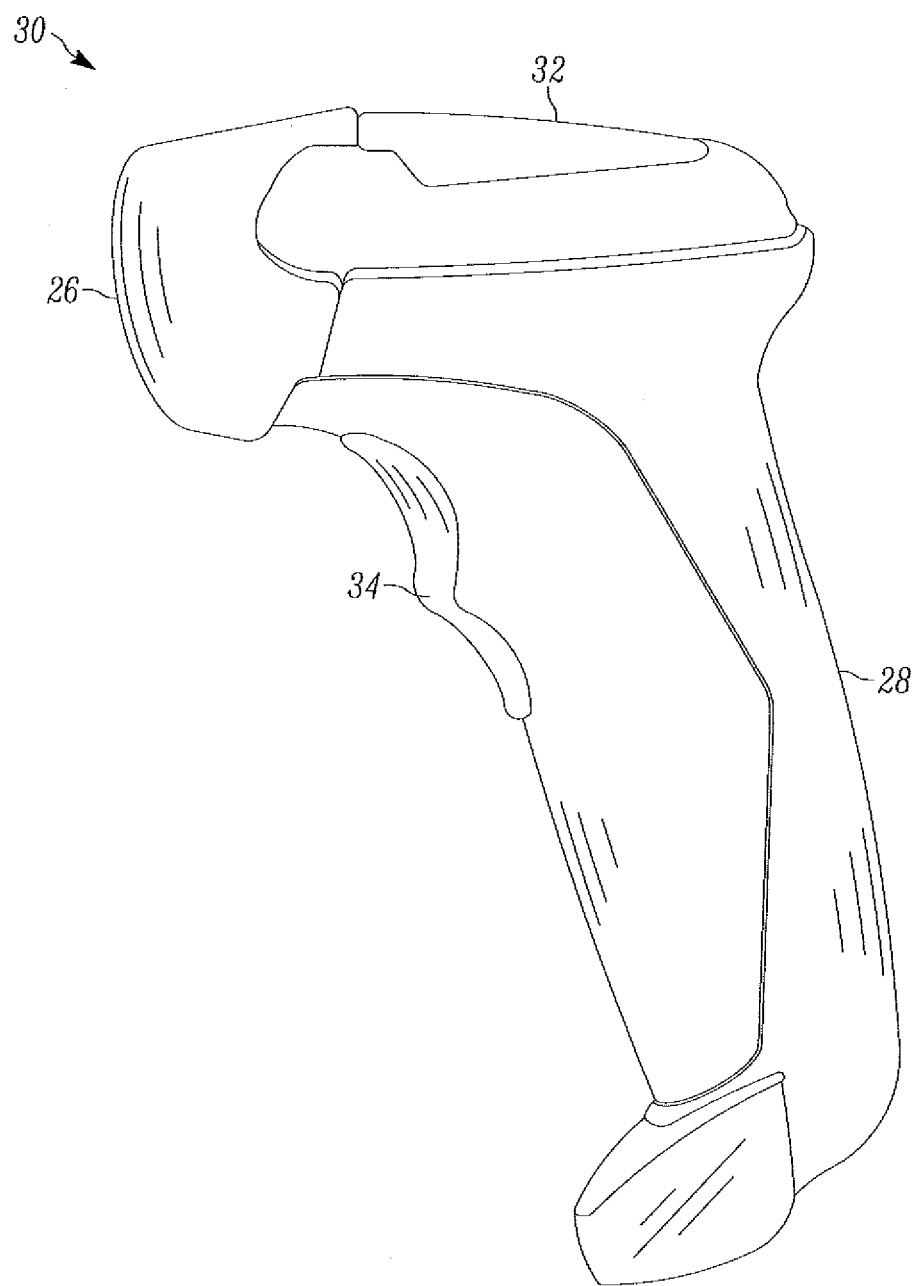
FIG. 1 is a side elevational view of a portable imaging reader operative for reading targets by image capture over an extended range of working distances in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an imaging module, also known as a scan engine, for setting one or more imaging parameters, e.g., exposure and/or gain values, of a default imager for imaging targets to be electro-optically read over a range of working distances away from the module, and for expeditiously setting exposure and/or gain values for another imager based on the previous setting of exposure and/or gain values for the default imager. Another aspect of the present disclosure relates to an imaging reader having a housing for supporting the imaging module, and a light-transmissive window on the housing.

In both aspects, the imaging module comprises an imaging assembly including a near imager for imaging targets over a relatively wider imaging field of view, and a far imager for imaging targets over a relatively narrower imaging field of view. A control system controls a default one of the imagers to capture an image of a target in a frame, determines a light intensity level of the captured image, sets at least one imaging parameter of the default imager based on the determined light intensity level, and automatically sets at least one imaging parameter of the other one of the imagers based on the at least one imaging parameter that was previously set for the default imager.

The image is comprised of an array of pixels arranged in a predetermined row number of rows and a predetermined column number of columns in a frame. Advantageously, the control system controls the default imager to capture a minor portion of the image that is comprised of pixels arranged in a number of rows less than the predetermined row number and in a number of columns less than the predetermined column number, and determines the light intensity level of the captured minor portion of the image. The pixels have individual brightness values, and the control system includes an image pre-processor for subdividing the frame into a plurality of sub-frames or windows, for determining the brightness values of all the pixels in each window to obtain a window brightness value, for averaging the window brightness values in the windows to obtain an average window brightness value, and for setting the at least one imaging parameter of the default imager based on the average window brightness value. The default imager operates at a predetermined frame rate. Since the control system determines the light intensity level only from the minor portion of the image, it can determine the light intensity level at a rate faster than the predetermined frame rate. Thus, the default imager is more rapidly and efficiently set with optimum exposure values and/or gain values than heretofore.

If the default imager cannot successfully read the target despite the exposure values and/or gain values that were set by the control system, then the control system will switch over to the other imager. Rather than repeating the steps of subdividing the frame into a plurality of sub-frames, determining the brightness values in each sub-frame, and averaging the brightness values in each sub-frame to obtain an average brightness value, the control system will automatically set the exposure values and/or gain values of the other imager based on the exposure values and/or gain values that were previously set for the default imager. This automatic setting can be performed by a rapid calculation, since each imager has a known f-stop and a known light responsivity, as well as a known size for its field of view. A memory or look-up table can store a plurality of predetermined exposure values and/or gain values.

Still another aspect of the present disclosure relates to a method of imaging targets to be electro-optically read by image capture over a range of working distances. The method is performed by imaging targets with a near imager over a relatively wider imaging field of view, by imaging targets with a far imager over a relatively narrower imaging field of view, by controlling a default one of the imagers to capture an image of a target in a frame, by determining a light intensity level of the captured image, by setting at least one imaging parameter of the default imager based on the determined light intensity level, and by automatically setting at least one imaging parameter of the other one of the imagers based on the at least one imaging parameter that was previously set for the default imager.

Reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A light-transmissive window 26 is located adjacent the front or nose of the body 32 and is preferably also tilted at an angle of inclination, for example, fifteen degrees, relative to the vertical. The imaging reader 30 is held in an operator's hand and used in a handheld mode in which a trigger 34 is manually depressed to initiate imaging of targets, especially bar code symbols, to be read in an extended range of working distances, for example, on the order of thirty to fifty feet, away from the window 26. Housings of other configurations, as well as readers operated in the hands-free mode, could also be employed.

Figure 2:
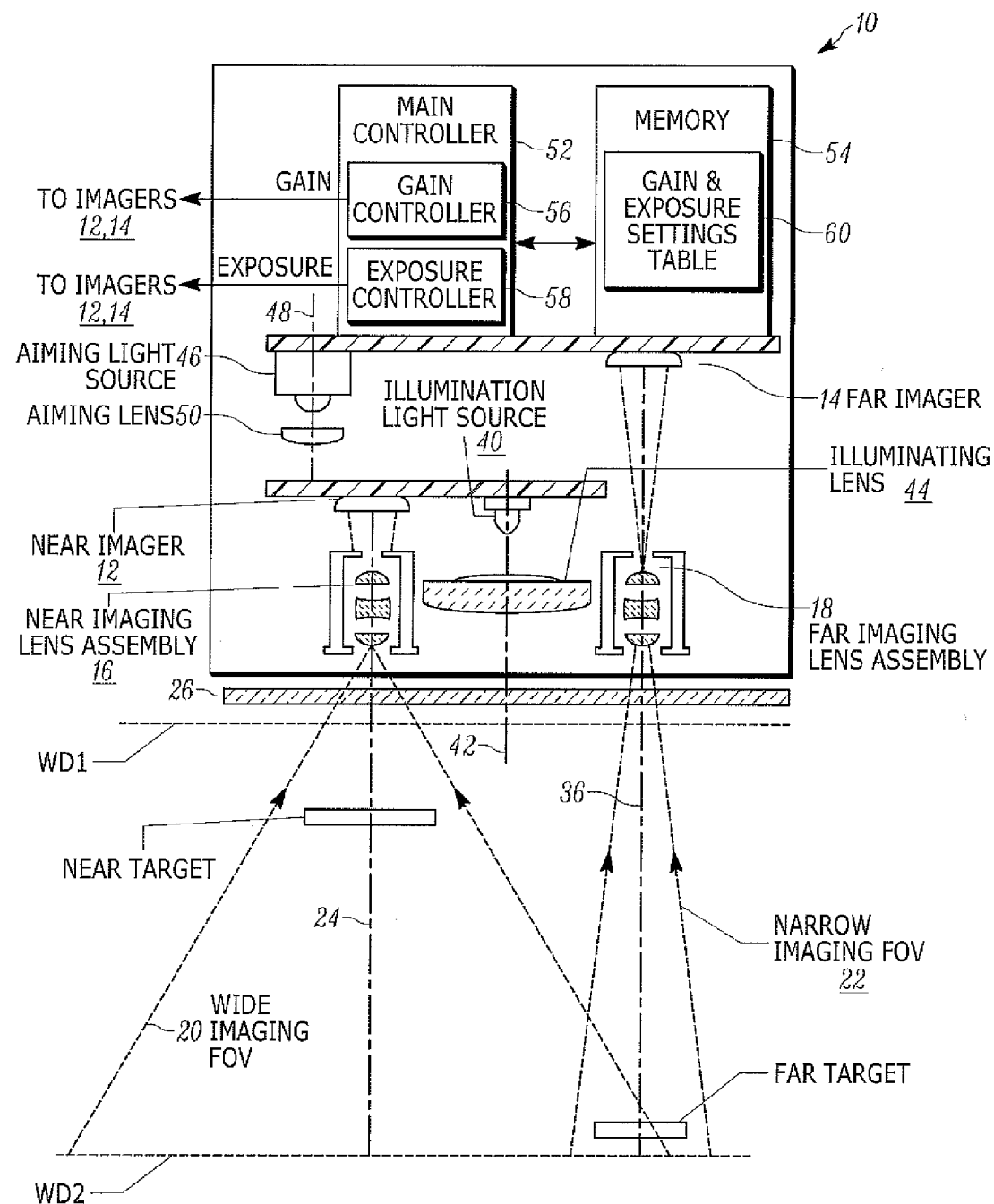
FIG. 2 is a schematic diagram of various components, including imaging, illuminating, and aiming assemblies supported on an imaging module that is mounted inside the reader of FIG. 1.
Figure 3:
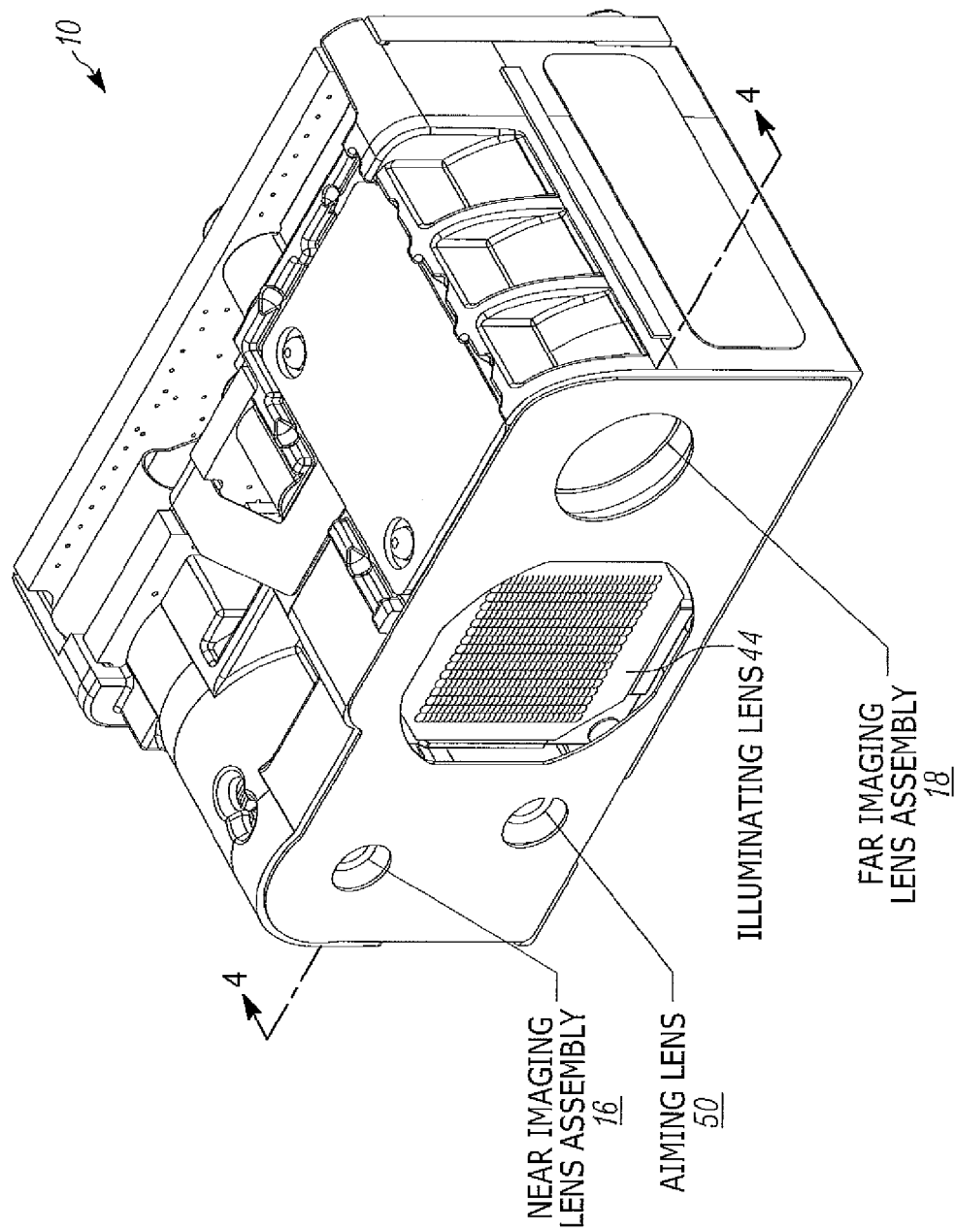
FIG. 3 is a perspective view of the imaging module of FIG. 2 in isolation.
Figure 4:
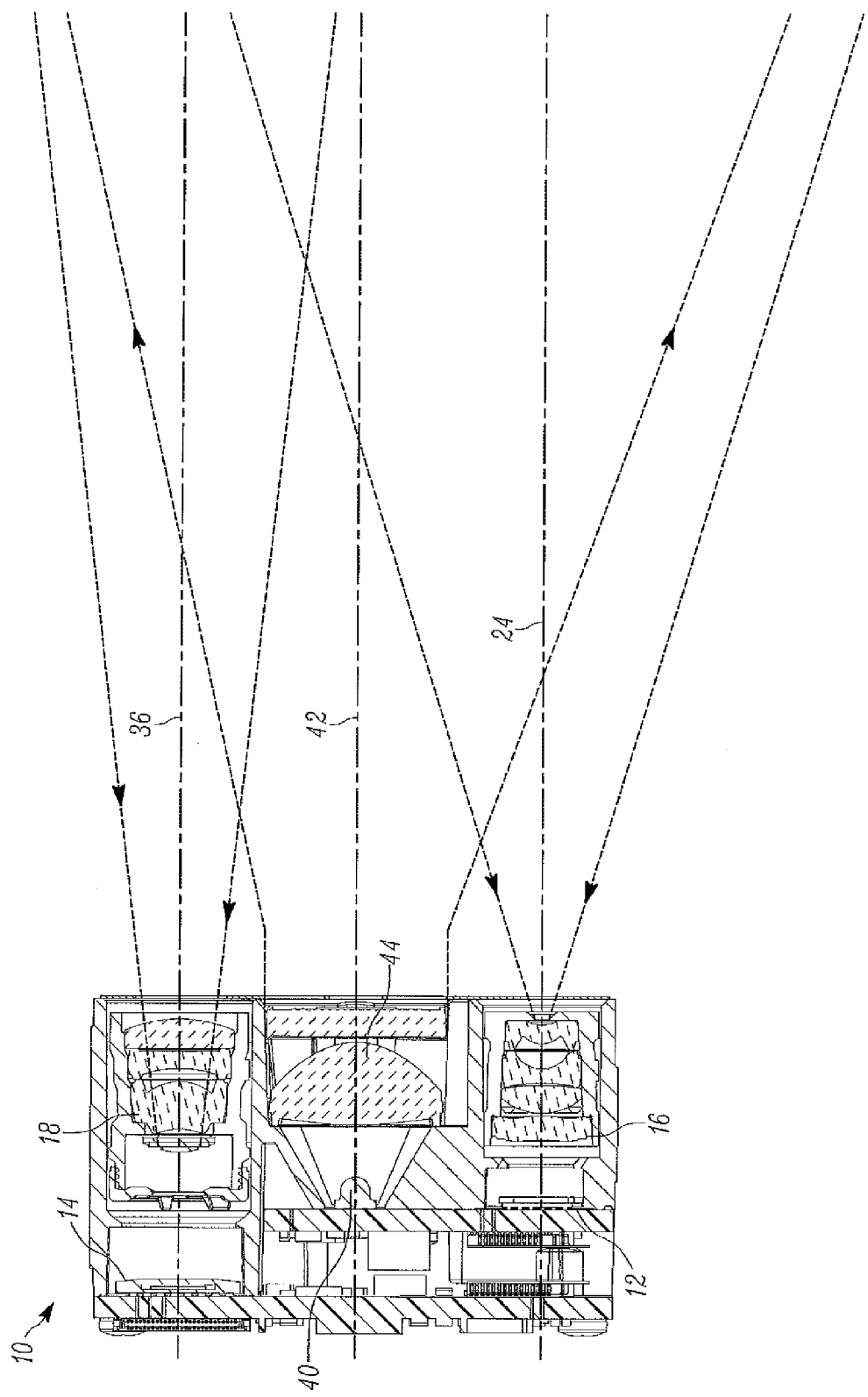
FIG. 4 is a cross-sectional view taken on line 4-4 of FIG. 3.

As schematically shown in FIG. 2, and as more realistically shown in FIGS. 3-4, an imaging module 10 is mounted in the reader 30 behind the window 26 and is operative, as described below, for expeditiously setting one or more imaging parameters, e.g., exposure and/or gain values, of a pair of imagers 12, 14 for imaging targets to be electro-optically read by image capture through the window 26 over an extended range of working distances away from the module 10. A target may be located anywhere in a working range of distances between a close-in working distance (WD1) and a far-out working distance (WD2). In a preferred embodiment, WD1 is either at, or about eighteen inches away from the window 26, and WD2 is much further away, for example, over about sixty inches away from the window 26. One of the imagers is a near imaging sensor or imager 12. A near imaging lens assembly 16 captures return light over a relatively wide imaging field of view 20 of the near imager 12, e.g., about thirty degrees, from a near target located in a close-in region of the range, e.g., from about zero inches to about eighteen inches away from the window 26, and projects the captured return light onto the near imager 12. A far imaging sensor or imager 14 and a far imaging lens assembly 18 capture return light over a relatively narrow imaging field of view 22, e.g., about sixteen degrees, from a far target located in a far-out region of the range, e.g., greater than about sixty inches away from the window 26, and project the captured return light onto the far imager 14. Although only two imagers 12, 14 and two imaging lens assemblies 16, 18 have been illustrated in FIG. 2, it will be understood that more than two could be provided in the module 10.

Each imager 12, 14 is a solid-state device, for example, a CCD or a CMOS imager having a one-dimensional array of addressable image sensors or pixels arranged in a single, linear row, or preferably a two-dimensional array of such sensors arranged in mutually orthogonal rows and columns, and operative for detecting return light captured by the respective imaging lens assemblies 16, 18 along respective imaging axes 24, 36 through the window 26. Each imaging lens assembly is advantageously a Cooke triplet, although other fixed focus and variable focus lens combinations can also be employed.

As also shown in FIG. 2, an illuminating light assembly is also supported by the imaging module 10 and includes an illumination light source, e.g., at least one light emitting diode (LED) 40, stationarily mounted on an optical axis 42, and an illuminating lens assembly that includes an illuminating lens 44 also centered on the optical axis 42. The illuminating light assembly is shared by both imagers 12, 14. As further shown in FIG. 2, an aiming light assembly is also supported by the imaging module 10 and includes an aiming light source 46, e.g., a laser, stationarily mounted on an optical axis 48, and an aiming lens 50 centered on the optical axis 48. The aiming lens 50 may be a diffractive or a refractive optical element, and is operative for projecting a visible aiming light pattern on the target prior to reading.

As further shown in FIG. 2, the imagers 12, 14, the LED 40 and the laser 46 are operatively connected to a control system that includes a main controller or programmed microprocessor 52 operative for controlling the operation of these components. A memory 54 is connected and accessible to the controller 52. Preferably, the controller 52 is the same as the one used for processing the return light from the targets and for decoding the captured target images. The control system also includes an image pre-processor that has a gain controller 56 and an exposure controller 58. The controllers 56, 58 are incorporated into a custom processor, such as an application-specific integrated circuit (ASIC) or a field-programmable gate array (FPGA). The custom processor may be a separate chip, or, as shown, it may be integrated into the same chip as the main controller 52.

The aforementioned aiming light assembly can also serve as a range finder to determine the distance to a target. The aiming axis 48 is offset from the imaging axes 24, 36 so that the resulting parallax provides target distance information. More particularly, the parallax between the aiming axis 48 and either one of the imaging axes 24, 36 provides range information from the pixel position of the aiming beam on one of the imaging sensor arrays. It is preferred to use the imaging axis 36 of the far imager 14, because the parallax error will be greater for the far imager 14 than for the near imager 12. Thus, the range finder can be used to locate the target to determine whether the target is in a close-in region, or a far-out region, of the range.

Figure 5:
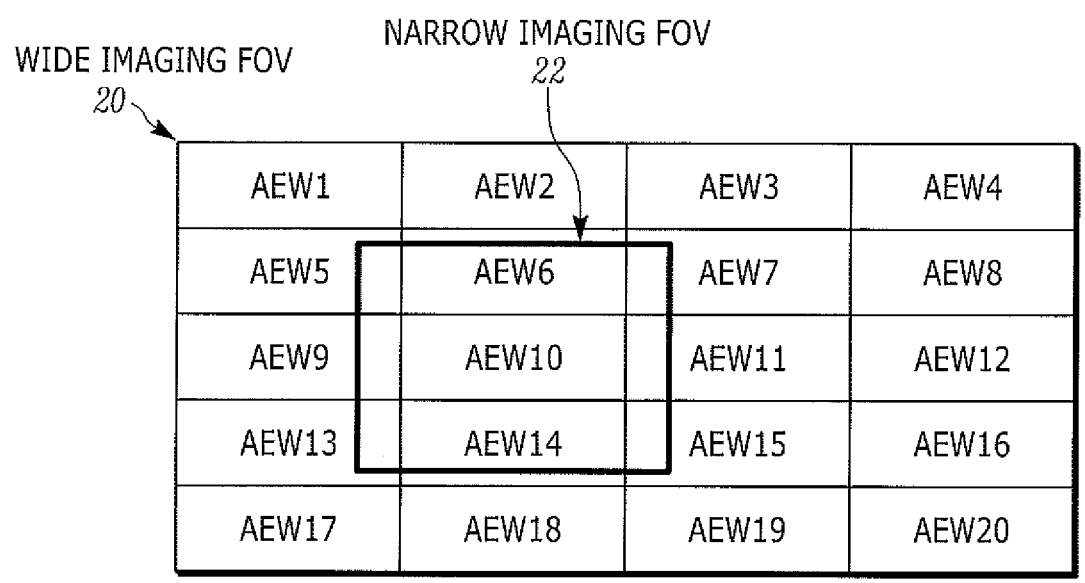
FIG. 5 is a schematic view of overlapping fields of view of a pair of imagers of the reader of FIG. 1.

In operation, the image pre-processor controls a default one of the imagers, for example, the far imager 14, to capture an image of the target in a frame, and preferably, a minor or fractional portion of the image of the target. For example, if the image is comprised of a two-dimensional array of pixels arranged in a predetermined row number (M) of rows and a predetermined column number (N) of columns, then the minor portion of the image is comprised of a sub-array of pixels arranged in a number of rows less than M and in a number of columns less than N. The sub-array can be located anywhere on the image, typically, in a central area of the frame. The image pre-processor then subdivides the minor portion of the image into a plurality of generally rectangular sub-frames, also known as auto-exposure windows (AEWs). As shown in FIG. 5, the wide imaging field of view 20 can, for example, be subdivided into twenty AEWs1-20, and the narrow imaging field of view 22 can be subdivided into a smaller sub-set of the AEWs1-20. The smaller sub-set is contained within the wide imaging field of view 20 and, as shown, is centered, for example, at AEW10.

The pixels have individual brightness values, and the image pre-processor determines the brightness values of all the pixels in each sub-frame AEW1-AEW20 of the narrow field of view 22 of the default far imager 14 to obtain a window brightness value, averages the window brightness values in the sub-frames to obtain an average window brightness value, and sets exposure and/or gain values for the default imager 14 based on the average window brightness value. The image pre-processor need not weigh the window brightness value of each sub-frame equally, but may weigh the window brightness values of one or more sub-frames, for example, those in the central area of the frame, more heavily than the sub-frames in the outer areas of the frame. The default imager 14 operates at a predetermined frame rate, e.g., 60 frames per second (fps). Since the image pre-processor determines the light intensity level only from the sub-frames of the minor portion of the image, the image pre-processor can determine the light intensity level at a rate faster than the predetermined frame rate. By way of numerical example, if the image is subdivided into four quadrants, then the minor portion of the image can be one of these quadrants, in which case, the image pre-processor can determine the light intensity level from the minor portion of the image at a rate that is four times faster, e.g., 240 fps, than the predetermined frame rate. Thus, the default imager 14 is more rapidly and efficiently set with optimum exposure values and/or gain values than heretofore.

The aforementioned memory 54 stores a set of exposure values and/or a set of gain values in a look-up table 60. The gain controller 56 of the image pre-processor can access the look-up table 60 and retrieve the correct gain value that corresponds to the determined light intensity level. The exposure controller 58 of the image pre-processor can access the look-up table 60 and retrieve the correct exposure value that corresponds to the determined light intensity level.

If the default imager 14 cannot successfully read the target despite the exposure values and/or gain values that were set by the image pre-processor, then the control system will switch over to the other imager 12. Rather than repeating the steps of subdividing the frame into a plurality of sub-frames, determining the brightness values in each sub-frame, and averaging the brightness values in each sub-frame to obtain an average brightness value, the image pre-processor will automatically set the exposure values and/or gain values of the other imager 12 based on the exposure values and/or gain values that were previously set for the default imager 14. This automatic setting can be performed by a rapid calculation, since each imager 12, 14 has a known f-stop and a known responsivity to light, as well as a known size for its field of view.

Knowing the exposure and gain values of the default imager 14 allows the exposure and gain values of the other imager 12 to be automatically initially set. The product of gain and exposure values is proportional to the square of the f-stop and to the imager responsivity to light, and is inversely proportional to the reciprocal of the target distance squared. For example, if the f-stop of the default far imager 14 is 7.8, and if the f-stop of the other near imager 12 is 5.6, and if the imagers 12, 14 have the same light responsivity, then the near imager 12 will collect approximately twice as much light than that of the default far imager 14. As a result, the exposure or gain values for the near imager 12 should be halved. This calculation is faster than having to analyze the brightness of the captured image again over successive frames.

Knowing the size of each field of view is another factor in setting the exposure and gain values of the other imager 12. As shown in FIG. 5, the narrow field of view 22 is smaller than, and overlaps, the wide field of view 20. As previously mentioned, the image pre-processor subdivides the wide field of view 20 into the sub-frames AEW 1-20, and subdivides the narrow field of view 22 into the sub-frames centered around AEW 10. The image pre-processor can, as described above, determine the average window brightness value for either field of view 20, 22 of one of the imagers 12, 14, and can use that value to assist in setting the exposure and gain values of the other imager 14, 12.

Once the gain and/or exposure values for the default imager 14 have been set by the gain and exposure controllers 56, 58, or once the gain and/or exposure values for the other imager 12 have been set by calculation, then the respective imager 12, 14 is operated by the main controller 52 to capture and decode an image of the target to be read. Reader performance is rapid and aggressive.

If it becomes necessary to switch back from the other imager 12 to the default imager 14, then rather than analyzing the brightness of the captured image again, the gain and/or exposure values for the other imager 12 can be used to set the gain and/or exposure values for the default imager 14. The size of each field of view, and its corresponding average window brightness value, can also be used to set the gain and/or exposure values. Thus, the gain and/or exposure values are constantly being updated.

Figure 6:
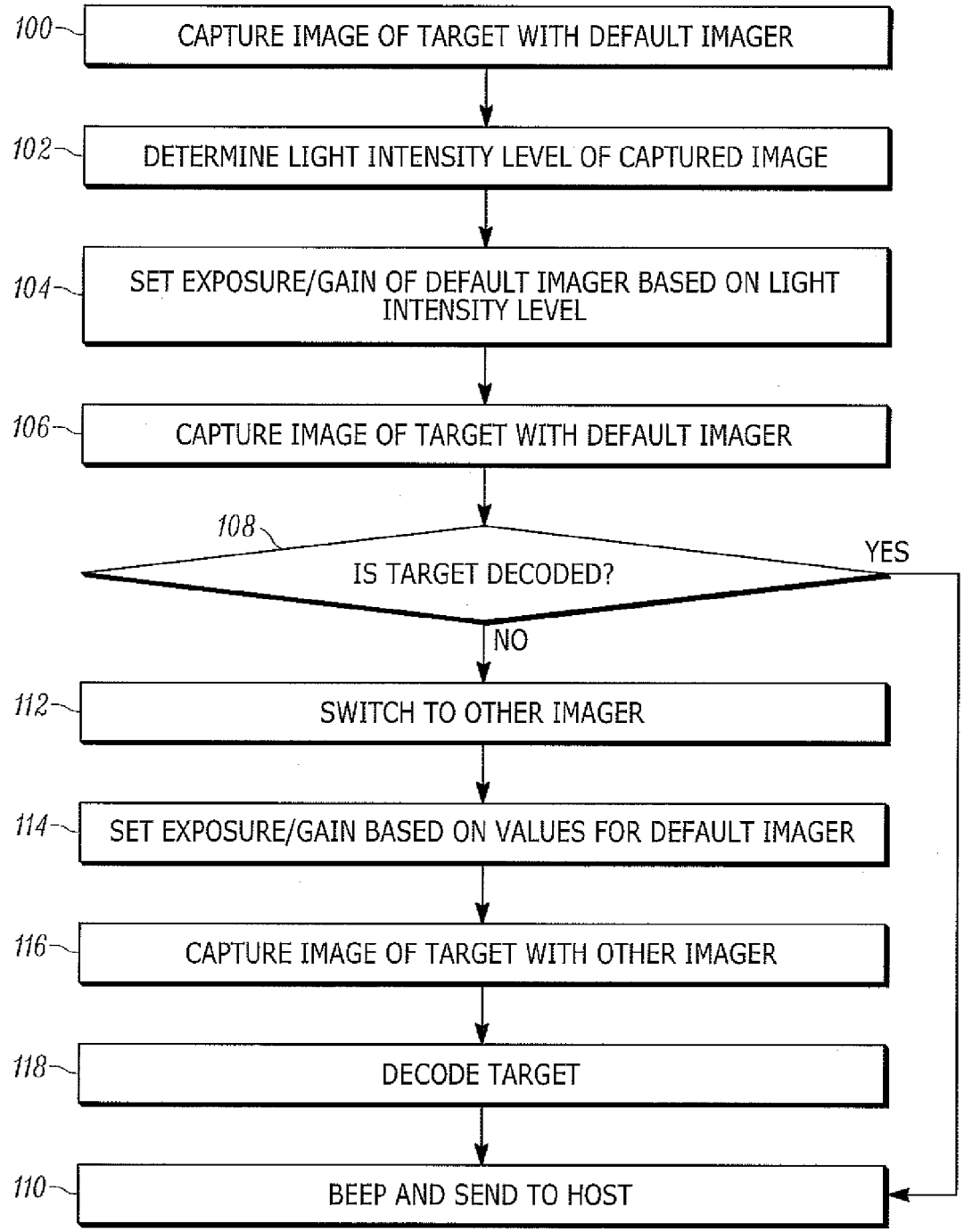
FIG. 6 is a flow chart depicting steps performed in accordance with a method of this disclosure.

The flow chart of FIG. 6 depicts the method disclosed herein. In step 100, either the entire image, or preferably a minor portion of the image, of the target is captured by one of the imagers by default, e.g., the far imager 14. In step 102, the light intensity level of the captured minor portion of the image is rapidly determined. As shown in FIG. 5, the minor portion of the image is the area centered around the AEW 10. Then, optimum exposure and/or gain values are set for the default imager 14 in step 104 based on the determined light intensity by referral to the look-up table 60. In step 106, the default imager 14, whose exposure and/or gain vales have already been set, captures an image of the target. In step 108, it is determined whether the target has been successfully decoded. If so, then the reader 30 beeps and sends the results of a successful decode to a remote host in step 110. If not, then the reader 30 switches to the other near imager 12 in step 112. The optimum exposure and/or gain values are set for the other near imager 12 in step 114 by calculation based on the known exposure and/or gain values that were previously set for the default imager 14. The sizes of the overlapping fields of view may also be taken into account to obtain the optimum exposure and/or gain values. In step 116, the other near imager 12, whose exposure and/or gain has just been set, captures an image of the target. In step 118, it is determined whether the target has been decoded by the other near imager 12. If so, then the reader 30 beeps and sends the results of a successful decode to a remote host in step 110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for imaging targets to be electro-optically read by image capture over a range of working distances away from the module, the module comprising:
   an imaging assembly including a near imager configured to image targets over a relatively wider, near imaging field of view, and a far imager configured to image targets over a relatively narrower, far imaging field of view; and
   a control system configured to control a default one of the imagers to capture an image of a target in a frame, to determine a light intensity level of the captured image, to set at least one imaging parameter of the default imager based on the determined light intensity level, and to automatically set at least one imaging parameter of the other one of the imagers based on the at least one imaging parameter that was previously set for the default imager, and to electro-optically read the target.

2. The module of claim 1, wherein the image is comprised of an array of pixels arranged in a predetermined row number of rows and a predetermined column number of columns; and wherein the control system controls the default imager to capture a minor portion of the image that is comprised of pixels arranged in a number of rows less than the predetermined row number and in a number of columns less than the predetermined column number, and wherein the control system determines the light intensity level of the captured minor portion of the image.

3. The module of claim 1, wherein the imaging assembly captures the image as an array of pixels having individual brightness values, and wherein the control system includes an image pre-processor for subdividing the frame into a plurality of sub-frames, for determining the brightness values of all the pixels in each sub-frame to obtain a sub-frame brightness value, for averaging the sub-frame brightness values in the sub-frames to obtain an average sub-frame brightness value, and for setting the at least one imaging parameter of the default imager based on the average sub-frame brightness value.

4. The module of claim 1, and a memory accessible to the control system for storing a plurality of predetermined values of the at least one imaging parameter for at least one of the imagers for retrieval by the control system, and wherein the predetermined values are different based on the determined light intensity level.

5. The module of claim 4, wherein the control system includes an exposure controller and a gain controller, wherein the plurality of predetermined values stored in the memory include a set of exposure values for retrieval by the exposure controller and a set of gain values for retrieval by the gain controller, wherein the exposure values are different based on the determined light intensity level, and wherein the gain values are different based on determined light intensity level.

6. The module of claim 1, wherein each imager has a known f-stop and a known light responsivity, and wherein the at least one imaging parameter automatically set by the control system for the other imager is based on each known f-stop and each known light responsivity.

7. The module of claim 1, wherein the imaging fields of view of the imagers overlap and have known sizes, and wherein the at least one imaging parameter automatically set by the control system for the other imager is based on each known size of the imaging fields of view.

8. An imaging reader for imaging targets to be electro-optically read by image capture over a range of working distances away from the reader, the reader comprising:
   a housing having a light-transmissive window; and
   an imaging module supported by the housing and including
   an imaging assembly having a near imager configured to image targets through the window over a relatively wider, near imaging field of view, and a far imager configured to image targets through the window over a relatively narrower, far imaging field of view, and
   a control system configured to control a default one of the imagers to capture an image of a target through the window in a frame, to determine a light intensity level of the captured image, to set at least one imaging parameter of the default imager based on the determined light intensity level, and to automatically set at least one imaging parameter of the other one of the imagers based on the at least one imaging parameter that was previously set for the default imager, and to electro-optically read the target.

9. The reader of claim 8, wherein the image is comprised of an array of pixels arranged in a predetermined row number of rows and a predetermined column number of columns; and wherein the control system controls the default imager to capture a minor portion of the image that is comprised of pixels arranged in a number of rows less than the predetermined row number and in a number of columns less than the predetermined column number, and wherein the control system determines the light intensity level of the captured minor portion of the image.

10. The reader of claim 8, wherein the imaging assembly captures the image as an array of pixels having individual brightness values, and wherein the control system includes an image pre-processor for subdividing the frame into a plurality of sub-frames, for determining the brightness values of all the pixels in each sub-frame to obtain a sub-frame brightness value, for averaging the sub-frame brightness values in the sub-frames to obtain an average sub-frame brightness value, and for setting the at least one imaging parameter of the default imager based on the average sub-frame brightness value.

11. The reader of claim 8, and a memory accessible to the control system for storing a plurality of predetermined values of the at least one imaging parameter for at least one of the imagers for retrieval by the control system, and wherein the predetermined values are different based on the determined light intensity level.

12. The reader of claim 11, wherein the control system includes an exposure controller and a gain controller, wherein the plurality of predetermined values stored in the memory include a set of exposure values for retrieval by the exposure controller and a set of gain values for retrieval by the gain controller, wherein the exposure values are different based on the determined light intensity level, and wherein the gain values are different based on determined light intensity level.

13. The reader of claim 8, wherein each imager has a known f-stop and a known light responsivity, and wherein the at least one imaging parameter automatically set by the control system for the other imager is based on each known f-stop and each known light responsivity.

14. The reader of claim 8, wherein the imaging fields of view of the imagers overlap and have known sizes, and wherein the at least one imaging parameter automatically set by the control system for the other imager is based on each known size of the imaging fields of view.

15. A method of imaging targets to be electro-optically read by image capture over a range of working distances, the method comprising:
   imaging targets with a near imager over a relatively wider, near imaging field of view;
   imaging targets with a far imager over a relatively narrower, far imaging field of view;
   controlling a default one of the imagers to capture an image of a target in a frame;
   determining a light intensity level of the captured image;
   setting at least one imaging parameter of the default imager based on the determined light intensity level; and
   automatically setting at least one imaging parameter of the other one of the imagers based on the at least one imaging parameter that was previously set for the default imager, and to electro-optically read the target.

16. The method of claim 15, and configuring the image to be comprised of an array of pixels arranged in a predetermined row number of rows and a predetermined column number of columns, and capturing a minor portion of the image that is comprised of pixels arranged in a number of rows less than the predetermined row number and in a number of columns less than the predetermined column number, and determining the light intensity level of the captured minor portion of the image.

17. The method of claim 15, and capturing the image as an array of pixels having individual brightness values, and subdividing the frame into a plurality of sub-frames, and determining the brightness values of all the pixels in each sub-frame to obtain a sub-frame brightness value, and averaging the sub-frame brightness values in the sub-frames to obtain an average sub-frame brightness value, and setting the at least one imaging parameter of the default imager based on the average sub-frame brightness value.

18. The method of claim 15, and storing a plurality of predetermined values of the at least one imaging parameter for each imager for retrieval, and configuring the predetermined values to be different based on the determined light intensity level.

19. The method of claim 18, wherein the storing of the plurality of predetermined values is performed by storing a set of exposure values for retrieval and a set of gain values for retrieval, and configuring the exposure values to be different based on the determined light intensity level, and configuring the gain values to be different based on determined light intensity level.

20. The method of claim 15, wherein the imagers have known f-stops, known light responsivities, and overlapping imaging fields of view of known sizes, and wherein the at least one imaging parameter automatically set for the other imager is based on each known f-stop, each known light responsivity, and each known size of the respective imaging field of view.

* * * * *